Nov. 1, 1960  A. FEIBUSH  2,958,335

SAFETY SEALING DEVICE FOR OIL BRAKES

Filed Sept. 25, 1956

INVENTOR.
ALEXANDER FEIBUSH
BY
ATTORNEY.

2,958,335
SAFETY SEALING DEVICE FOR OIL BRAKES

Alexander Feibush, New York, N.Y., assignor to Alex Manufacturing Corporation, Brooklyn, N.Y.

Filed Sept. 25, 1956, Ser. No. 611,838

5 Claims. (Cl. 137—460)

There is no doubt that oil brakes in automotive vehicles are of very great efficiency and are in fact much liked in view of this. There is only one inherent drawback in such brakes: When one of the oil conduits starts to leak or one of the pistons develops a leak this is not noticed by the driver and at the next application of brakes i.e. the depression of the brake pedal the oil is soon pumped out and the brakes at all four wheels are put out of action.

The present invention relates to a device intended to serve as a safeguard, effectively sealing off the damaged point in a pressure conduit, especially a brake system, against the rest of it so that no substantially part of the oil is lost and the brakes can effectively be applied to at least one pair of wheels.

The new device comprises a conduit for the brake fluid and a bypass to the said conduit, there being inserted in the said conduit a floating piston permitting passage of brake fluid between the wall and the said floating piston, there being further provided in the said conduit a differential piston the face of smaller area of which is directed towards the floating piston and the oncoming stream of brake fluid, such face of smaller area being normally positioned near the point where the bypass branches off, while the face of greater area of the differential piston is positioned before (in the direction of travel of fluid) the point where the bypass rejoins the said conduit, said piston being designed to close said bypass, the said floating piston being distanced from the said differential piston.

The invention will now be described with reference to the annexed drawing in which.

A car having four wheels $a$ each of which is provided with a brake drum $b$ has a brake system comprising conventionally a container $c$ for the brake fluid, a central brake cylinder $d$, the piston of which can be actuated by a pedal $e$. Usually from the central cylinder $d$ conduits $f$ lead to each of the brake drums wherein, as usual individual cylinders for each wheel are positioned. It is clear that, since the whole system forms a continuous line, a leak at whatever point will result in the quick loss of the whole brake fluid thereby putting the brakes out of action. The new device which is preferably positioned at $g$, i.e. at the point where individual conduits $f$ are branched off to the brake drums $b$, will obviate this.

Figure 1:
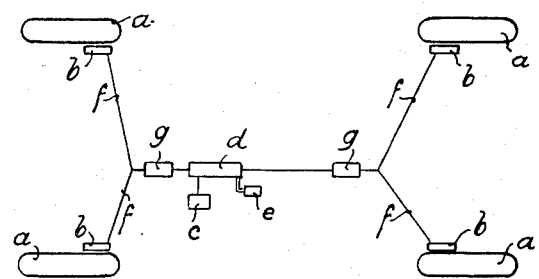
Fig. 1 is a schematic diagram of the brake system of a car.
Figure 2:
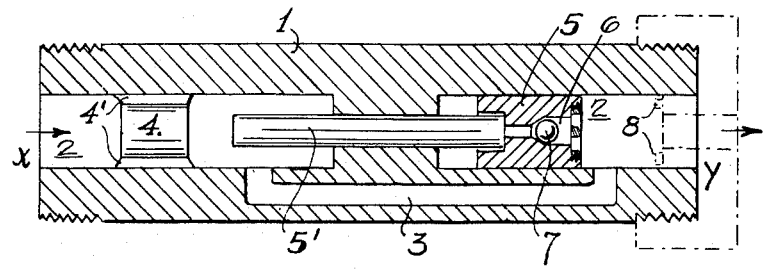
Fig. 2 is an axial section through the new device.

The construction of the new device can be best seen from Fig. 2. In housing 1 is provided a main conduit 2 reaching from end to end of the housing. At both these ends appropriate covers (not shown), with means for connecting the device to the oil conduit, are provided. The flow of oil is in the direction of the arrows, i.e. entering the device at $x$ and leaving at $y$. Near the entrance to conduit 2 there is branched off a bypass 3 rejoining conduit 2 near its end. In conduit 2, between the entrance to it and the entrance into bypass 3 there is positioned a floating piston 4 having radial guiding ribs 4' so that between the piston and the wall of conduit 2 a passage is left for the brake fluid. Beyond piston 4 and beyond the entrance to bypass 3 there is positioned a differential piston 5 the smaller face 5' of which is directed towards piston 4, but spaced therefrom. The larger face of differential piston 5 is directed towards the exit of bypass 3. Differential piston 5 could be made integrally of one piece but I prefer to construct a piston merely for the sake of convenient mounting, in the following way:

A portion of smaller diameter and a portion of wider diameter of the piston are joined together, the former being e.g. screwed into the latter. The wider portion of the piston fits with an exactly tight fit into the bore of conduit 2, thus for introducing it therein the air from the conduit must have a means of escape. There could be provided for this purpose a small vent in the wall of the conduit behind this part of the piston, but this would not be desirable because of the danger of an oil leakage. So the air cannot escape rearwardly towards $x$ since the thinner portion of piston 5 equally fits into its bore with an airtight fit. For this reason in the wider portion of piston 5 an axial bore 6 is provided which is closed by a ball valve 7, opening towards $y$.

The new device functions as follows:

Inserted in the oil conduit, it is the task of the device to permit the passage of oil from central cylinder $d$ to the brake drums $b$ through conduits $f$. Thus oil entering through the inlet port at $x$ will pass through the gap provided by ribs 4' into the space beyond the floating piston 4. It will then pass quickly through bypass 3 into the space beyond the larger face of piston 5. Now pressure will be exerted on piston 5 from both sides; but its forward area being larger the piston will be held in the position shown in Fig. 2, i.e. the uninterrupted passage of oil from the bypass will be secured. Herein the floating piston has the following task: In actuating the brake the fluid is set in motion. In this initial movement dynamic pressure will be exerted by the moving fluid onto the smaller face of the differential piston and none on its larger face. Thus it could happen that as a consequence piston 5 is pressed forward closing the outlet of the bypass and immobilising the device. In other words such an arrangement would be too sensitive. To avoid this the floating piston serves as a kind of baffle, shielding the differential piston against the moving fluid, at least until the fluid has entered the conduit in front of piston 5. Floating piston 4 will, during this time, have been moved up to the small end of piston 5. But this movement will be immediately reversed by the fluid flowing backwards when the brake is released and the floating piston will be restored in its initial position.

Assuming now that a leak develops in one of the conduits $f$ or beyond them, pressure will abruptly cease on the larger face of the piston but pressure will persist on its smaller face, with the effect that the entire differential piston 5 will be shifted in the direction of the arrows thereby effectively sealing the outlet end of bypass 3. In other words no oil will any more reach the damaged section of the system. Suitable abutments (not shown) for the pistons are provided.

In initially mounting the new device, the thinner part of differential piston is first put into place, then the wider part is pushed in, air escaping through bore 6, ball valve 7 having opened whereupon the two parts of piston 5 can be joined together. In operation of the device ball valve 7 is kept closed by the pressure of the brake fluid.

So that a driver can notice a fault developed and sealed by the new device, at the end y of the device there may be provided e.g. two terminals 8 in the said cover connected with the electric system of the car, contact between these terminals being established when the metallic face of piston 5 sealing bypass 3 is pushed onto the two terminals. This would result in a signal lamp being lighted at the dash board or elsewhere within sight of the motorist.

Instead of the floating piston a tight fitting piston provided with one or more throughgoing bores may be provided. In this case the length of the bypass will be such that inlets and outlet of the bypass will be closed simultaneously by the two pistons.

Having now particularly described and ascertained the nature of my said invention and in what manner the same is to be performed, I declare that what I claim is:

1. A safety sealing device for pressure fluid conduits comprising, in combination, a housing arranged to be connected in a pressure fluid conduit between a source of fluid pressure and fluid pressure actuated mechanism, said housing having a relatively large diameter entrance passage and a corresponding diameter exit passage separated by an intermediate partition having a relatively small diameter bore therethrough and a by-pass passage interconnecting said entrance and exit passage and opening through ports in the side walls thereof; and a differential piston freely movable in said housing including a relatively large diameter first section having a sealing fit in said exit passage and a relatively small diameter second section having a sealing fit through said bore and projecting into said entrance passage, whereby said first section is subjected to the pressure downstream of said device and the second section is subjected to the source pressure; means to provide a vent between said intermediate partition and said first section the port in said exit passage being spaced from said partition a distance greater than the length of said first piston section and said first piston section being movable into and out of closing relation with the portion in the exit passage; said first piston section, when the pressures in said entrance and exit sections are substantially equal, being pressure biased toward said partition to uncover the port in said exit passage for substantially unrestricted flow of fluid through said by-pass passage, and the pressure on said second piston section, when there is a loss of pressure downstream of said device, moving said first piston section away from said partition to block the port in said exit passage, and a floating piston in said entrance passage upstream of said first piston section and formed for substantial flow of fluid therepast.

2. A safety sealing device as claimed in claim 1 in which said first piston section comprises a piston and said second piston section comprises a rod secured thereto.

3. A safety sealing device as claimed in claim 2 including a pair of electrical contacts in said exit passage interconnected by said second piston section in the port closing position.

4. A safety device for brakes comprising a housing having a fluid inlet and a fluid outlet, a partition between said fluid inlet and outlet, a fluid by-pass to connect said fluid inlet and outlet, piston means freely movable in said outlet in response to differential fluid pressures applied thereto and having means extending through said partition into said fluid inlet, means to provide a vent between said partition and said piston means, and baffle means freely movable in said fluid inlet in response to inlet fluid pressure applied thereto, said piston means having differential surfaces against which equal fluid pressures in said fluid inlet and outlet are applied to move said piston means to open said by-pass and against which unequal fluid pressures in said fluid inlet and outlet are applied to move said piston means to close said by-pass.

5. A safety device comprising a housing having a fluid inlet and outlet separated by a partition, a fluid by-pass connecting said separated fluid inlet, outlet and piston means freely movable in said housing and in said fluid inlet and outlet, said piston means having unequal surfaces thereon against which unequal fluid pressures in said fluid inlet and outlet are applied to move said piston means to close said by-pass and against which equal fluid pressures in said inlet and outlet are applied to move said piston means to open said by-pass, means to provide a vent between said partition and said piston means, and baffle means freely movable in said inlet between the fluid entering said inlet and said piston means in said fluid inlet.

References Cited in the file of this patent

UNITED STATES PATENTS

| | | |
|---|---|---|
| 371,063 | Hays | Oct. 4, 1887 |
| 1,563,143 | Bailie | Nov. 24, 1925 |
| 2,140,027 | Myllyniemi | Dec. 13, 1938 |
| 2,238,124 | Mathieson | Apr. 15, 1941 |
| 2,239,348 | Wirtanen | Apr. 22, 1941 |
| 2,379,308 | McClure | June 26, 1945 |
| 2,410,202 | Crawford | Oct. 29, 1946 |
| 2,674,095 | Kirk | Apr. 6, 1954 |
| 2,691,385 | Budd | Oct. 12, 1954 |

FOREIGN PATENTS

| | | |
|---|---|---|
| 141,017 | France | of 1881 |
| 458,321 | Italy | July 10, 1950 |